H. L. BONNETT.
ADJUSTABLE RAKE.
APPLICATION FILED MAY 5, 1915.
1,200,160.
Patented Oct. 3, 1916.
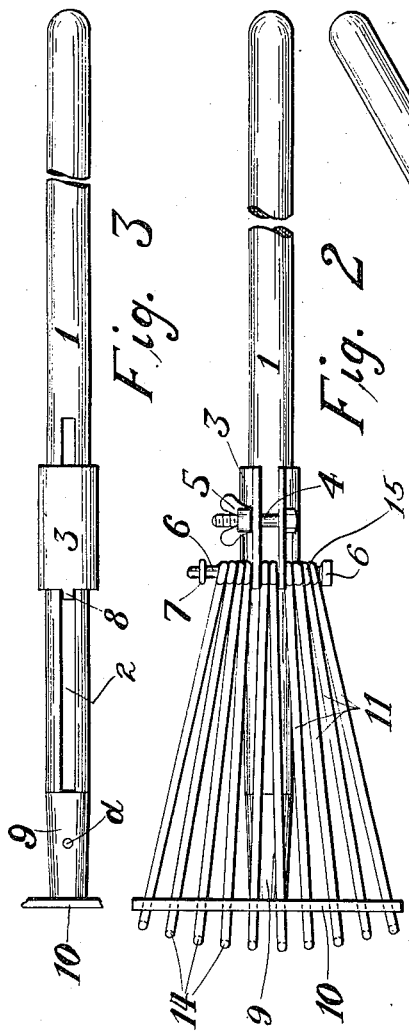
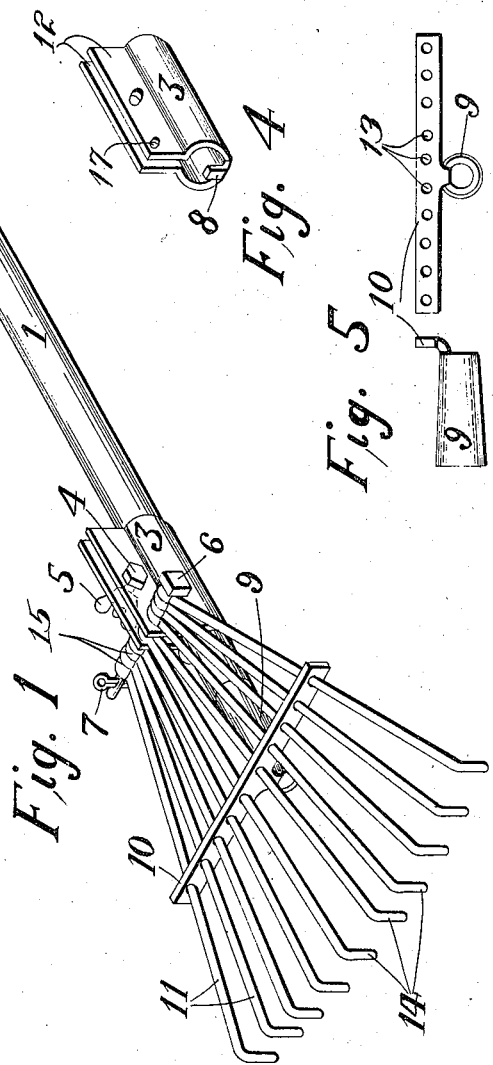
INVENTOR
Henry L. Bonnett
by Harry C. Schroeder
ATTORNEY

UNITED STATES PATENT OFFICE.

HENRY L. BONNETT, OF OAKLAND, CALIFORNIA.

ADJUSTABLE RAKE.

1,200,160.　　　　　Specification of Letters Patent.　　Patented Oct. 3, 1916.

Application filed May 5, 1915. Serial No. 25,965.

*To all whom it may concern:*

Be it known that I, HENRY L. BONNETT, a citizen of the United States, residing at Oakland, in the county of Alameda and State of California, have invented certain new and useful Improvements in Adjustable Rakes, of which the following is a specification.

This invention relates to improvements in hand rakes and more particularly to a type of rake having adjustable teeth, the principal object being to provide an improved device of this character having teeth which are adjustable in relation to the space therebetween.

Other objects of the invention are to provide a device which is cheap in construction, simple to adjust, and which will hold its position when once set.

With these and other objects in view my invention consists in the novel construction, combination and arrangement of parts as herein illustrated and more particularly pointed out in the appended claim.

Reference being had to the accompanying drawing forming a part of this specification, Figure 1 is a view in perspective showing my improved rake having the teeth in a partly open position. Fig. 2 is a view in plan of the same showing the teeth in their closed relation. Fig. 3 is a view in side elevation of the rake handle and sliding sleeve used thereon. Fig. 4 is a view in perspective of the sliding sleeve above mentioned. Fig. 5 is a view in front and side elevation of the yoke in which the rake teeth are slidably mounted.

Referring to corresponding parts by the same numerals of reference, 1 denotes the rake handle having therein a slot 2 adjacent the forward end. Slidably mounted on this handle is a sleeve 3 formed with upwardly bent wings 12 through which extends a bolt 4 provided with a wing nut 5 by which the sleeve may be clamped tight upon the handle 1. The sleeve is provided with an inwardly extending lug 8 adapted to seat in the groove 2 of handle 1 thereby preventing this sleeve from rotating in relation to the handle. To the front end of the handle is fastened a tapering socket 9 having the forwardly extending yoke bar 10, which latter is provided with a plurality of holes 13 through which extend the rake bars or tines 11. These tines are provided with the angular bent ends 14 to form the raking points of the device. The rear ends of the teeth are provided with an eye 15 through which extends a bolt 6, this bolt passing through holes 17 in the sleeve wings 12. Through the opposite end of this bolt is inserted a cotter pin 7 whereby the bolt is prevented from falling out of the eyes in the rake teeth.

The operation of this device is as follows: When the nut 5 is turned a sufficient amount to allow the sleeve 3 to slide on the handle 1 it will be apparent that the said sleeve may be moved along the handle. When the said sleeve is moved toward the rear end of the handle the angle between the various bars is decreased thereby decreasing the distance between the points of the rake teeth. On the other hand, if this sleeve is pushed outwardly, the distance between the holes 13 being greater than the spacing of the bars on the bolt 6, it will be evident that the nearer the bolt is moved to the yoke the greater will become the angle between the rake bars and consequently the farther apart the teeth 14 will become. When the desired distance between the teeth is secured the sleeve 3 will be clamped upon the handle by means of nut 5 thereby holding the rake in rigid form.

While I have shown and described the preferred embodiment of my invention it will be understood that minor changes may be made in detail and design without departing from the scope thereof.

What I claim and wish to cover by Letters Patent is:—

1. An adjustable rake head comprising a handle, a sleeve slidable in said handle, a bar fixed to the end of said handle and having a plurality of spaced openings, a plurality of tines having eyes, said eyes being attached to said sleeve in closely spaced relation, and rake teeth formed on the outer ends of said tines.

2. An adjustable rake head comprising, a handle, a sleeve slidable in said handle, said handle having a longitudinal slot formed thereon, a lug formed on said sleeve and extending into said slot to prevent rotation of said sleeve, a bar fixed to the end of said handle and having a plurality of spaced openings, a plurality of tines having eyes, said eyes being attached to said sleeve in closely spaced relation and rake teeth formed on the outer ends of said tines.

In testimony whereof I affix my signature.

HENRY L. BONNETT.